United States Patent [19]
Tovar

[11] Patent Number: 5,699,022
[45] Date of Patent: Dec. 16, 1997

[54] ADAPTIVE CABLE EQUALIZER

[75] Inventor: Oscar A. Tovar, Plano, Tex.

[73] Assignee: DSC Communications Corporation, Plano, Tex.

[21] Appl. No.: 598,814

[22] Filed: Feb. 9, 1996

[51] Int. Cl.$^6$ ........................................ H04B 3/04
[52] U.S. Cl. ........................................ 333/18; 333/304
[58] Field of Search ........................ 333/18; 330/304; 375/232

[56] References Cited

U.S. PATENT DOCUMENTS

| | | | |
|---|---|---|---|
| 3,812,436 | 5/1974 | Fudemoto et al. | 333/18 |
| 4,061,970 | 12/1977 | Magneron | 333/18 X |
| 4,243,956 | 1/1981 | Lemoussu et al. | 333/18 |
| 4,525,684 | 6/1985 | Majefski | 330/304 |

OTHER PUBLICATIONS

Author unknown, "Adaptive Cable Equalizer for High–Speed Data Recovery", National Semiconductor, Dec. 1995, pp. 1–8.

*Primary Examiner*—Paul Gensler
*Attorney, Agent, or Firm*—Baker & Botts, L.L.P.

[57] ABSTRACT

An adaptive cable equalizer (10) includes an input section (12) that receives a radio frequency electrical signal from a cable (14). The input section (12) provides the electrical signal to an equalizing amplifier section (16) that controls an amount of current flow of the electrical signal to an equalizing controller (18). The equalizing controller (18) generates an equalized output signal (21) through a voltage drop which is proportional to a roll-off distortion of the cable (14). The voltage drop is processed by an amplifier (80) and a line receiver (88) to reconstruct the electrical signal in a digital representation of the equalized output signal (21). The voltage drop is also fed to a detector (20) that generates a control signal (23) and a bias signal (25) to adjust the conductivity of the equalizing amplifier section (16). In this manner, adjustments are automatically made in order to provide the equalized output signal (21) regardless of the characteristics of the cable (14).

16 Claims, 1 Drawing Sheet

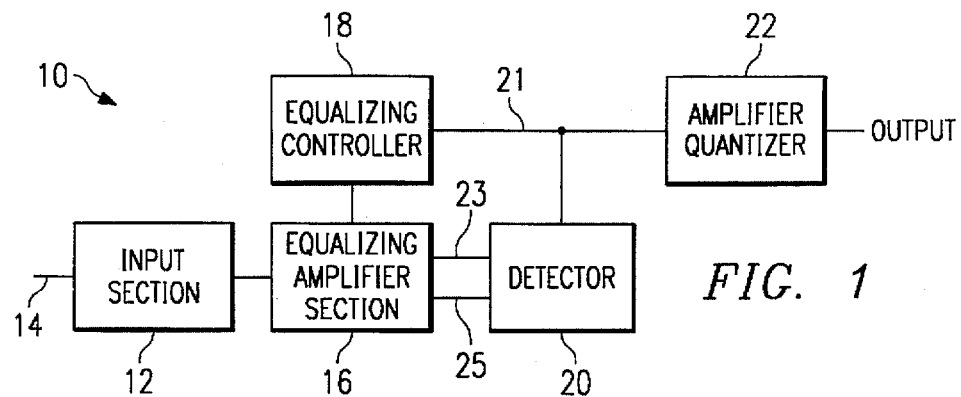
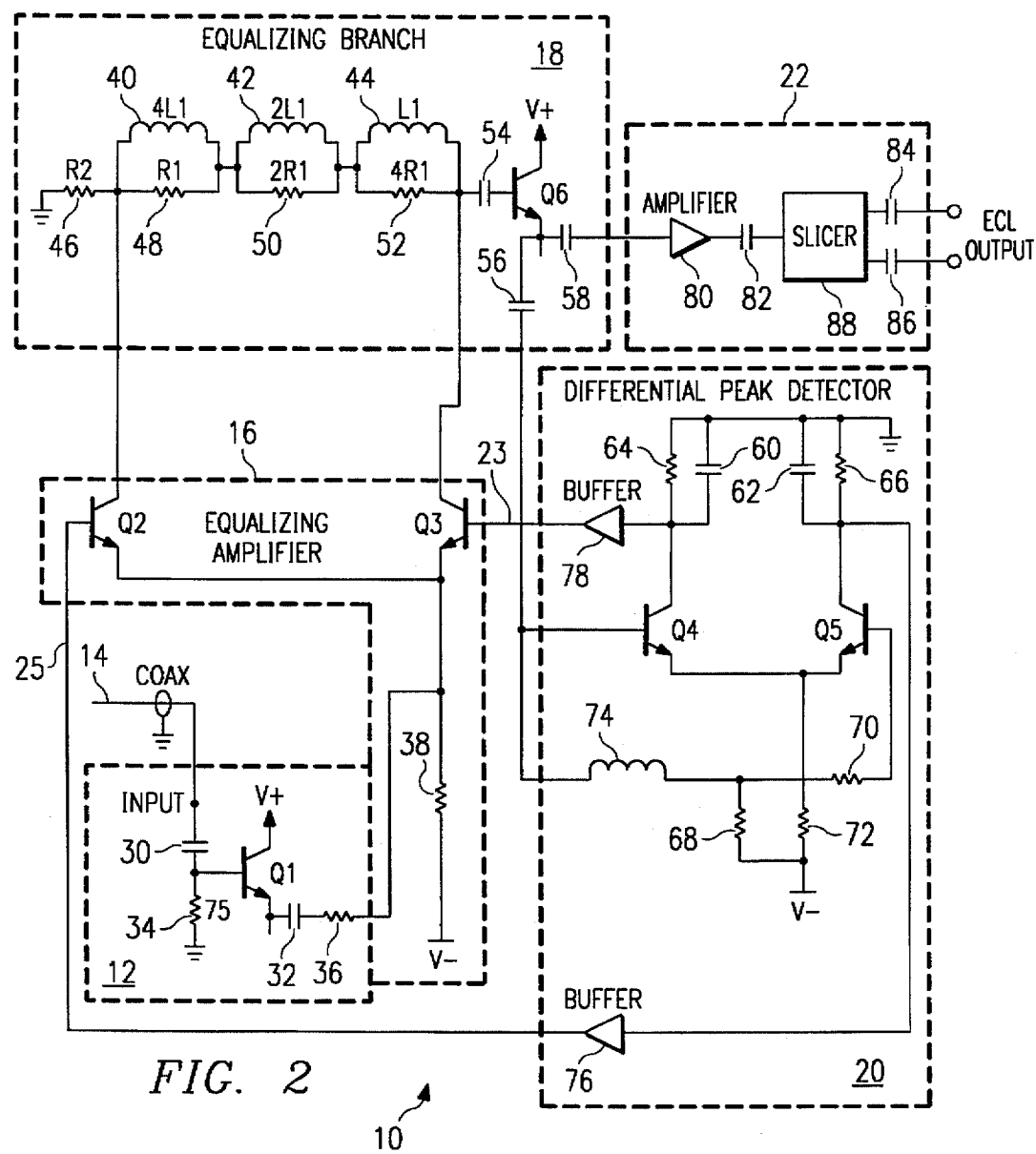

ADAPTIVE CABLE EQUALIZER

TECHNICAL FIELD OF THE INVENTION

The present invention relates in general to telecommunications transmission techniques and more particularly to an adaptive cable equalizer.

BACKGROUND OF THE INVENTION

For a wideband electrical signal passing through a coaxial cable, the cable attenuates the high frequency components more than the low frequency components of the electrical signal. This phenomenon is known as cable roll-off distortion. This distortion makes recovery of information within the electrical signal at the output of the cable a difficult process. This distortion mainly affects the amplitude of the electrical signal, leaving signal phase and group delay undistorted. A typical cable equalizer is a two port network with a frequency response opposite to that of the cable. When the cable equalizer is cascaded with the cable, the resulting total frequency response is relatively flat allowing for recovery of the information in the electrical signal.

The distortion caused by the coaxial cable is a function of the structure and geometry of the cable. For example, comparing two coaxial cables having the same characteristic impedance and the same roll-off response, the thicker cable can have a longer length than the thinner cable. The thinner cable has more attenuation than the thicker cable, resulting in its shorter length as compared to the thicker cable. Many applications follow a specification for the maximum cable roll-off response up to a certain frequency. The wideband electrical signal is allowed to pass through coaxial cable lengths ranging from a short length to the length in which the roll-off response equals the specification. Conventional equalization techniques would require that one separate cable equalizer be customly designed for each length of the cable and each cable type that satisfies the specification. Therefore, it is desirable to have a cable equalizer that provides equalization regardless of the specifications of those cables.

SUMMARY OF THE INVENTION

From the foregoing, it may be appreciated that a need has arisen for a cable equalizer that provides equalization for a variety of different cable lengths that satisfy the required specifications. In accordance with the present invention, there is provided an adaptive cable equalizer that substantially eliminates or reduces disadvantages and problems associated with conventional cable equalizers.

According to an embodiment of the present invention, an adaptive cable equalizer is provided that includes an input section operable to receive a cable signal from a cable. An equalizing amplifier section compensates for distortion and insertion loss in the cable signal. An equalizing controller section generates a voltage drop in response to the cable signal corresponding to a roll-off distortion of the cable. A detector section generates a control signal in response to the voltage drop. The control signal drives the equalizing amplifier section to adjust an amount of current flow for the cable signal from the input section to the equalizing controller section in order to provide the distortion and insertion loss compensation to the cable signal.

The present invention provides various technical advantages over conventional cable equalizing techniques. For example, one technical advantage is to adaptively adjust a compensation to the cable signal regardless of the length of the cable. Another technical advantage is to compare a voltage drop of an equalized signal to a biasing value in order to adjust a current flow in generating the equalized signal. Other technical advantages are readily apparent to one skilled in art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 1 illustrates a block diagram of an adaptive cable equalizer; and

FIG. 2 illustrates a schematic diagram of the adaptive cable equalizer.

DETAILED DESCRIPTION OF THE INVENTION

FIG. 1 is a block diagram of an adaptive cable equalizer 10. Adaptive cable equalizer 10 includes an input section 12 that receives an electrical signal from a cable 14. The electrical signal is passed to an equalizing amplifier section 16 that determines an amount of current flow of the electrical signal to be applied to an equalizing controller 18. The equalizing controller 18 generates an equalized output signal 21 in the form of a voltage drop that is applied to a detector 20 and an amplifier/quantizer section 22. Detector 20 generates a control signal 23 and a bias signal 25 to control conductivity of equalizing amplifier section 16 in response to equalized output signal 21. Amplifier/quantizer section 22 generates a digital representation of equalized output signal 21 in order to recover the original electrical signal applied to cable 14 in response to the voltage drop generated by equalizing controller 18.

The equalizing function performed by adaptive cable equalizer 10 takes advantage of impedance versus frequency increases in inductor devices. The impedance multiplied by a constant magnitude current produces a voltage drop that also increases with frequency, a phenomenon opposite to the roll-off response of cable 14. Through an inductor—resistor network within equalizing controller 18, the roll-off response of cable 14 is compensated for and the voltage drop is generated. The voltage drop is peak detected, amplified, and quantized to reconstruct the original electrical signal. Two control lines are fed back to equalizing amplifier section 16 to reference the amount of current allowed to pass through the inductor—resistor network of equalizing controller 18.

FIG. 2 is a simplified schematic diagram of adaptive cable equalizer 10. Input section 12 includes a transistor Q1, capacitors 30 and 32, and resistors 34 and 36. Equalizing amplifier section 16 includes transistors Q2 and Q3 and resistor 38. Equalizing controller 18 includes inductors 40, 42, and 44, resistors 46, 48, 50, and 52, capacitors 54, 56, and 58, and transistor Q6. Detector 20 includes transistors Q4 and Q5, capacitors 60 and 62, resistors 64, 66, 68, 70, and 72, inductor 74, and line buffers 76 and 78. Amplifier/quantizer section 22 includes an amplifier 80, capacitors 82, 84, and 86, and slicer circuitry 88.

In operation, input section 12 functions as a 75 ohm input matching impedance port based on a radio-frequency emitter follower circuit that feeds transistors Q2 and Q3 of equalizing amplifier section 16 with a radio-frequency signal.

Resistors 36 and 38 provide a control and calibration function for input section 12. Transistors Q2 and Q3 are biased in a common base configuration with emitters connected to the radio-frequency signal from input section 12. The collectors of transistors Q2 and Q3 pass the radio-frequency signal to equalizing controller 18. The conductivities of transistors Q2 and Q3 are controlled by bias signal 25 and control signal 23, respectively. As the length of cable 14 increases, transistor Q3 conducts more to allow current to pass through equalizing controller 18. For short cable lengths, transistor Q3 virtually shuts off and transistor Q2 provides all the amplification to allow the current to flow toward ground potential. The conductivities of transistors Q2 and Q3 are complementary to each other.

Equalizing controller 18 has inductors 40, 42, and 44 that are coupled with parallel resistors 48, 50, and 52, respectively. The inductance of inductor 40 is twice that of inductor 42 which has twice the inductance of inductor 44. Similarly, the impedance of resistor 52 is twice that of resistor 50 which has twice the impedance of resistor 48. The biggest resistor parallels the smallest inductor and the smallest resistor parallels the biggest inductor. The inductor—resistor network of equalizing controller 18 provides the proportionality to the roll-off distortion response of cable 14. Resistor 46 provides a low impedance connection to ground potential for the collector of transistor Q2.

The equalizing output signal is generated from the collector of transistor Q3 through an emitter follower amplifier of transistor Q6 in the form of a voltage drop. This voltage drop drives detector 20 and amplifier/quantizer section 22. In amplifier/quantizer section 22, the equalized output signal is enhanced by amplifier 80 and then applied to line receiver 88 which quantizes or slices the enhanced equalized output signal in order to reconstruct the original signal applied to cable 14 in digital form. In detector 20, the equalized output signal passes through a differential amplifier configuration of transistors Q4 and Q5. Transistors Q4 and Q5 are set at different biasing values in order to differentially generate control signal 23 and bias signal 25. Capacitors 60 and 62 in parallel with resistors 64 and 66, respectively, provide the averaging function of detector 20.

For a specific application example, STM-1/E4 digital hierarchy electrical interfaces typically use 75 ohm characteristic impedance coaxial cables whose roll-off follows an approximate square root frequency law and have a maximum insertion loss of 12.7 db @ 78 MHz and 12 db @ 70 MHz, respectively. There are many different brands of coaxial cable that satisfy this specification, such as the RG59 and the ATT728A. The RG59 matches the specification at a length of 100 feet, while the ATT728A matches the specification at a length of 180 feet due to its larger thickness as compared to the RG59. For this specification, the STM-1/E4 electrical signal is allowed to pass through up to 180 feet of the ATT728A or 100 feet of the RG59. Adaptive cable equalizer 10 automatically compensates for the insertion loss and distortion for different cables and their range of cable lengths used in the STM-1/E4 digital hierarchy electrical interfaces. Adaptive cable equalizer 10 automatically reshapes the distortion and compensates for the roll-off response of these cables, equalizing the length of the coaxial cables up to the maximum roll-off response of the required specification.

In summary, an adaptive cable equalizer compensates for the distortion and insertion loss introduced by a cable regardless of the length or type of the cable. An equalizing controller provides a response proportionately opposite to a roll-off response of the cable. A detector monitors an output response from the equalizing controller and generates control signals to adjust the current flow of the signal from cable entering the equalizing controller.

Thus, it is apparent that there has been provided, in accordance with the present invention, an adaptive cable equalizer that satisfies the advantages set forth above. Although the present invention has been described in detail, it should be understood that various changes, substitutions, and alterations may be made herein. For example, though specific elements are shown to have direct connections, elements may be coupled together through intermediary elements while still providing the functionality described. Other examples are readily ascertainable to one of skill in the art and may be made without departing from the spirit and scope of the present invention as defined by the following claims.

What is claimed is:

1. An adaptive cable equalizer, comprising:

an input section operable to receive a cable signal from a cable;

an equalizing amplifier section operable to compensate for distortion and insertion loss in the cable signal;

an equalizing controller section operable to generate an equalized signal corresponding to a length of the cable in response to the cable signal;

a detector section operable to receive the equalized signal from the equalizing controller section, the detector section operable to generate a control signal and a bias signal in response to the equalized signal, the control signal and the bias signal operable to adjust a conductivity of the equalizing amplifier section in order to provide the distortion and insertion loss compensation to the cable signal.

2. The adaptive cable equalizer of claim 1, further comprising:

an output amplifying section operable to generate an output representation of the cable signal in response to the equalized signal.

3. The adaptive cable equalizer of claim 1, wherein the equalizing controller section generates a voltage drop at the equalized signal, the voltage drop being proportional to a roll off response of the cable signal.

4. The adaptive cable equalizer of claim 1, wherein the equalizing amplifier section controls an amount of current passing through the equalizing controller section in response to the control signal and the bias signal from the detector section.

5. The adaptive cable equalizer of claim 1, wherein the detector section performs differential detection of the equalized signal for generating the control signal and the bias signal, the detector section using different biasing values in generating the control signal and the bias signal.

6. An adaptive cable equalizer, comprising:

an input section operable to receive a cable signal from a cable;

an equalizing amplifier section operable to compensate for distortion and insertion loss in the cable signal;

an equalizing controller section operable to generate an equalized signal corresponding to a length of the cable in response to the cable signal;

a detector section operable to receive the equalized signal from the equalizing controller section, the detector section operable to generate a control signal in response to the equalized signal, the control signal operable to adjust a conductivity of the equalizing amplifier section in order to provide the distortion and insertion loss compensation to the cable signal; and a line receiver section operable to generate a digital signal in response to the output representation of the cable signal.

7. An adaptive cable equalizer, comprising:

an input section operable to receive a cable signal from a cable;

an equalizing amplifier section operable to compensate for distortion and insertion loss in the cable signal;

an equalizing controller section operable to generate an equalized signal corresponding to a length of the cable in response to the cable signal;

a detector section operable to receive the equalized signal from the equalizing controller section, the detector section operable to generate a control signal in response to the equalized signal, the control signal operable to adjust a conductivity of the equalizing amplifier section in order to provide the distortion and insertion loss compensation to the cable signal, wherein the equalizing controller section includes a first conductor and a second inductor, the first inductor having twice an inductance of the second inductor.

8. The adaptive cable equalizer of claim 7, wherein the equalizing controller section has a first resistor in parallel with the first inductor and a second resistor in parallel with the second inductor.

9. The adaptive cable equalizer of claim 8, wherein the second resistor has twice the impedance as the first resistor.

10. An adaptive cable equalizer, comprising:

an input section operable to receive a cable signal from a cable;

an equalizing amplifier section operable to compensate for distortion and insertion loss in the cable signal;

an equalizing controller section operable to generate an equalized signal corresponding to a length of the cable in response to the cable signal;

a detector section operable to receive the equalized signal from the equalizing controller section, the detector section operable to generate a control signal in response to the equalized signal, the control signal operable to adjust a conductivity of the equalizing amplifier section in order to provide the distortion and insertion loss compensation to the cable signal wherein the detector section performs differential detection of the equalized signal for generating the control signal and a bias signal, the detector section using different biasing values in generating the control signal and the bias signal, wherein the equalizing amplifier section includes a first transistor and a second transistor for receiving the cable signal, the first transistor being driven by the control signal and the second transistor being driven by the bias signal.

11. A method of equalizing a cable signal from a cable, comprising the steps of:

receiving the cable signal at an input;

amplifying the cable signal;

generating a voltage drop from the amplified cable signal having a proportional relationship to a roll off response of the cable, the voltage drop being generated according to a length of the cable;

generating a control signal and a bias signal in response to the voltage drop;

controlling amplification of the cable signal with the control signal and the bias signal to maintain the proportional relationship;

amplifying the voltage drop to generate an equalized output signal;

quantizing the equalized output signal to reconstruct the cable signal into a digital representation.

12. An adaptive cable equalizer, comprising:

an emitter follower input operable to receive a cable signal from a cable and generate a radio frequency signal therefrom;

an equalizing amplifier operable to adjust a current flow of the radio frequency circuit, the equalizing amplifier including a first transistor and a second transistor in a common base configuration;

an equalizing branch operable to generate a voltage drop from the radio frequency signal proportional to a roll off response of the cable, the equalizing branch including a first inductor in parallel with a first resistor and a second inductor in parallel with a second resistor;

a differential peak detector operable to generate a control signal and a bias signal in response to the voltage drop, the control signal and the bias signal driving the equalizing amplifier to control a conductivity of the first and second transistors;

an output quantizer operable to generate a digital representation of the cable signal in response to the voltage drop.

13. The adaptive cable equalizer of claim 12, wherein the equalizing branch automatically compensates the insertion loss and distortion introduced into the cable signal regardless of a length of the cable.

14. The adaptive cable equalizer of claim 12, wherein the first transistor of the equalizing amplifier provides more conduction for increased lengths of the cable.

15. The adaptive cable equalizer of claim 12, wherein the differential peak detector is a differential amplifier with separate biasing values for the control signal and the bias signal.

16. The adaptive cable equalizer of claim 12, wherein the equalizing amplifier includes a third transistor to eliminate double trace interference on the radio frequency signal.

* * * * *